Aug. 8, 1944.   T. H. JACOB   2,355,441
COMBINATION TRAILER
Filed May 8, 1941
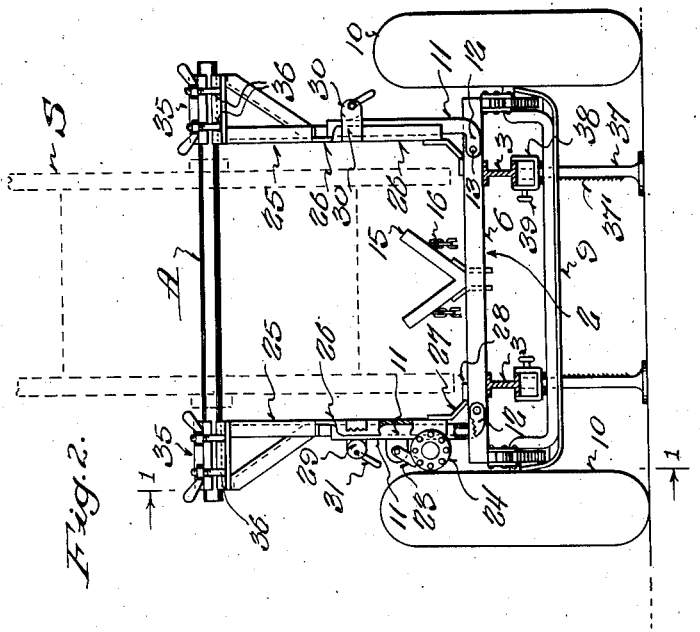
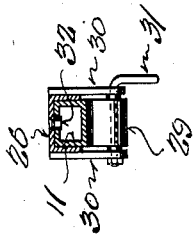
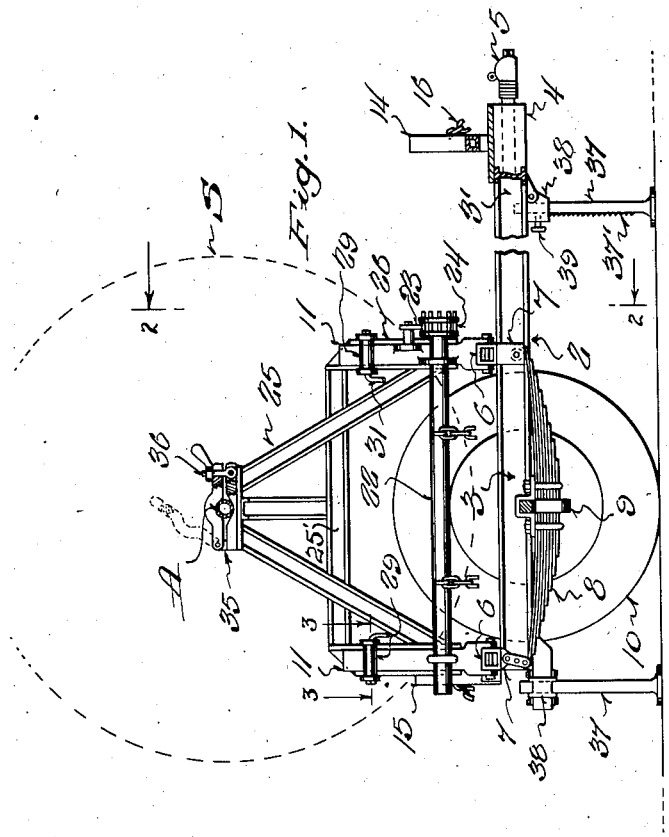
INVENTOR
THOMAS H. JACOB
BY
ATTORNEYS Patented Aug. 8, 1944

2,355,441

UNITED STATES PATENT OFFICE 2,355,441

COMBINATION TRAILER

Thomas H. Jacob, Wausau, Wis.

Application May 8, 1941, Serial No. 392,402

2 Claims. (Cl. 242—90)

The present invention pertains generally to trailers, and more particularly to a combination trailer that may be readily converted for various special and general utility purposes.

Because of the extensive use of trailers today for all classes of transportation, many concerns, such as utility and construction companies, find it necessary to purchase various types of trailers for handling different kinds of supplies or material. This requires a heavy investment, and because of the limited use of certain types of trailers, the overhead cost of transportation becomes exceedingly high.

For example, electric, telephone, and telegraph companies require trailers for transporting conduit and cable spools, as well as trailers for poles and other supplies. However, it has been estimated that a spool trailer is only in use approximately two per cent of the time, and naturally during the time that it is idle, no profit is realized on the trailer.

It is therefore one of the primary objects of this invention to provide a trailer consisting of a main frame for receiving poles, logs and the like having a novel spool supporting structure detachably mounted thereon.

Another salient object of the invention is to provide novel means for constructing the main frame and the spool supporting structure whereby said spool supporting structure can be quickly associated with the main frame in a strong and rugged manner.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawing:

Figure 1 is a longitudinal sectional view of a trailer incorporating one form of the present invention, the same being taken on the line 1—1 of Figure 2.

Figure 2 is a vertical transverse sectional view taken on the line 2—2 of Figure 1.

Figure 3 is a detail sectional view taken on the line 3—3 of Figure 1 illustrating the locking mechanism for the spool supporting structure.

With particular reference to the accompanying drawing, a trailer is shown consisting of a main frame 2, preferably fabricated from structure steel, and comprising side beams 3, converging at their forward ends to provide a tongue 3', and welded or otherwise connected to a block 4, which carries a conventional hitch 5 of any desired type. The hitch illustrated is of the ball and socket type, but it is to be understood that other hitches, such as a lunette ring or shackle connection, may be employed without affecting the invention.

The rear ends of the side frames 3 are connected by tubular front and rear bunks 6, preferably welded to the side beams 3. Secured to the ends of the bunks are brackets 7 to which leaf springs 8 are connected, while the springs 8 are attached to an underslung axle 9, supported upon pneumatic tired wheels 10.

Connected to the front and rear bunks 6 adjacent their opposite ends, are tubular uprights 11, provided at their lower ends with offset ears 12 that straddle the bunks, and which are pivotally connected thereto by pintles 13. The tubular uprights 11, for convenience in assembling an attachment hereinafter to be disclosed, are rectangular or tubular in cross section. The purpose for pivotally mounting the uprights 11, which serve as stakes when transporting logs, is to permit the same to be turned down upon the frame during loading of the logs from one side of the trailer, thus eliminating the necessity of raising the logs to clear the uprights in their vertical position, which allows them to be rolled upon the trailer.

Rigidly mounted upon the forward end of the tongue 3' is a crotch 14, aligned with a crotch 15, carried by the rear bunk 6. These crotches, 14 and 15, serve to form a cradle for the reception of a telephone pole or the like. (Not shown.) Chains 16 can be used to hold the pole in the crotches.

For the purpose of securing a load logs or the like on the trailer, one set of the uprights 11 is provided with a chain winch 22 which may be manipulated by a crank or crowbar, and locked in adjusted position by a reversible dog 23 engaging a ratchet wheel 24 secured to one end of the winch.

When the trailer is to be used for ordinary utility purposes, such as transportation of bulk material or small supplies, a body or box not shown is positioned between the uprights 11, and detachably secured upon the bunks 6, or to the uprights in any desired manner.

When it is desired to transport a spool S of wire for laying out electric stretches for use in telephone or similar equipment, the trailer is equipped with a spool supporting skeleton frame. The skeleton frame embodies pairs of spaced vertically disposed converging standards 25, the lower ends of which are secured to angle iron legs 26 which are nested about the uprights 11 and slidably engage the same throughout their length. The lower ends of said legs have extending therefrom off-set feet 27 that engage blocks 28 extending from the upper surface of the bunks 6 to limit inward movement of the uprights 11 and to further brace the skeleton frame. Said skeleton frame is also braced by a horizontally disposed strut 25', which strut is in welded union with the standards 25 and also the upper ends of the legs 26.

In assembling the skeleton frame for use, the legs thereof are nested about the uprights 11 and are clamped thereto by eccentric rollers 29 pivotally carried by the ears 30 extending in pairs from the legs 26 near the upper ends of the uprights whereby they serve as encircling clamps therefor.

The eccentrics 29 are manipulated by crank handles 31 and to further insure rigid attachment between the legs and uprights 11, as best shown in Figure 3, studs 32 carried by the legs engage apertures formed in the uprights 11.

Secured upon the upper ends of the standards 25, are split clamping blocks 35, for reception of the spool axle A, the upper portions of the blocks being hinged to the lower plates, and locked in clamping position by any suitable means, such as bolts 36 pivotally connected to the lower plates and projecting through slots in the hinged upper members.

Here it will be noted that in order to avoid the necessity of special separate tools for converting the trailer to different uses, all of the securing devices are provided with connected handles or cranks.

In many instances, particularly when the trailer is used in connection with spools, it is desirable to firmly anchor the trailer, and support the same in horizontal position to prevent twisting of the spool as the cable is unwound. This is accomplished by means of adjustable legs 37, slidably journaled in brackets 38 connected with the frame and tongue. Spring held pins 39 engaging rack teeth formed on the legs, serve to lock the same in adjusted position, and due to the fact that the front legs 37 cannot be raised sufficiently high because of the load to provide necessary road clearance, its bracket 38 is pivotally connected to the tongue as best shown in Figure 1.

In the light of the foregoing explanation considered in connection with the accompanying drawing, it will be readily seen that a comparatively simple, sturdy, and inexpensive trailer has been devised, which can be quickly and easily converted for every need which materially reduces trailer requirements in the transportation of various types of loads, and consequently permits practically continued use of the trailer, and a material reduction of transportation expense.

I claim:

1. A truck having side beams transversely disposed bunks connecting the beams, foldable spaced uprights in pivotal union with the bunks, a removable skeleton frame the same embodying companion pairs of side supports comprising legs in nested engagement with the uprights, eccentrics in pivotal union with the legs near the upper ends of said uprights for encasing and manually gripping said uprights, diverging standards secured to the legs near their lower ends, blocks connecting the upper ends, a removable spool secured to the blocks whereby the side elements of the frame are braced transversely and a horizontal brace connecting the upper ends of the legs and diverging standards.

2. In a truck having side beams and transversely disposed bunks carried thereby; the combination of a removable spool supporting skeleton frame mounted thereon, comprising standards, legs carried thereby, foldable uprights in pivotal union with the truck frame bunks and in nested engagement with the legs, gripping means carried by the upper ends of the legs for securing the uprights, feet secured to the lower ends of said legs, blocks secured to the bunks offset from and engageable with the leg feet, and clamping blocks connecting the upper ends of the skeleton frame standards for the reception of a transversely disposed spool mounted upon the clamping blocks.

THOMAS H. JACOB.